Jan. 1, 1952      A. E. ERICSON      2,580,416
ELECTRON PROD
Filed June 17, 1946
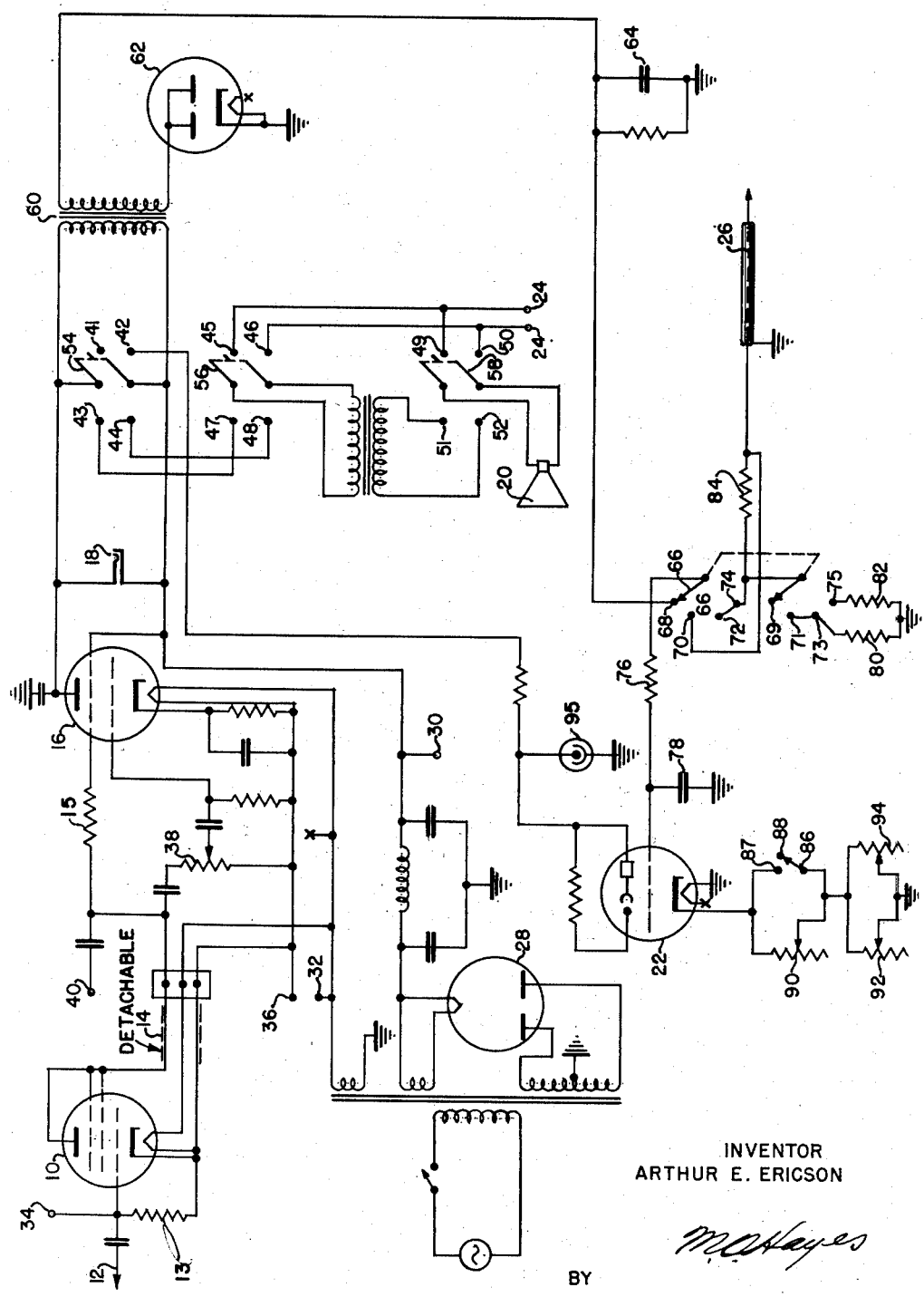
INVENTOR
ARTHUR E. ERICSON
BY *M. C. Hayes*
ATTORNEY Patented Jan. 1, 1952

2,580,416

UNITED STATES PATENT OFFICE 2,580,416

ELECTRON PROD

Arthur E. Ericson, Beverly, Mass.

Application June 17, 1946, Serial No. 677,148

5 Claims. (Cl. 250—20)

(Granted under the act of March 3, 1883, as amended April 30, 1928; 370 O. G. 757)

This invention relates to test instruments, and more particularly to equipment for testing the operation of electronic apparatus.

Usual methods for locating sources of trouble in electronic apparatus such as radios, radar systems, audio amplifiers, modulators, etc., involve tedious and time-consuming voltage and resistance checks. Such methods frequently fail, particularly when trying to localize such troubles as noise, hum, and intermittent operation. So-called signal tracers are also employed, but such equipment in present use requires tuning to the input frequency and requires changes when shifting from a radio frequency to an audio frequency input.

It is, therefore, the object of the present invention to provide improved apparatus for testing electronic apparatus.

Another object is to provide improved apparatus for signal tracing in electronic apparatus.

These and other objects will be more apparent upon consideration of the following specification, taken in connection with the accompanying drawing, the single figure of which illustrates an embodiment of the present invention.

Referring to the drawing, tube 10 and its associated circuit amplifies and detects, if necessary the signal voltage contacted by prod 12. The amplified signal is conducted through shielded cable 14 to tube 16, which further amplifies the signal voltage. The audio output of tube 16 is always applied to phone jack 18, and is also applied to either loud speaker 20 or magic eye tube 22. Loud speaker 20 may be used externally, offering either a low or high impedance input at jacks 24, 24. Either positive or negative voltages, as contacted by prod 26, can be measured, using the magic eye tube 22 as an indicator. Three voltage ranges are available in the present embodiment. Rectifier tube 28 supplies D.-C. voltages for the tubes used herein, and makes available at jack 30 a D.-C. voltage for external use. Filament voltage for external use is available at jack 32.

More specifically, tube 10 is connected as a triode and functions as a modified grid leak detector, the cathode and the first control grid functioning as a diode detector with the rectified voltage being developed across grid to cathode resistance 13. This rectified voltage is then amplified in the plate circuit of the tube, the resistor 15 serving as the plate load for the amplifier. Tube 10, therefore, corresponds roughly to a diode detector plus one stage of audio-frequency amplification. The tube 10 and resistor 13 are housed in a separate unit carrying prod 12, and are connected to the main unit by shielded cable 14. Thus, if modulated radio-frequency signals are contacted by prod 12, they are detected, amplified and applied to the input circuit of amplifier stage 16; if audio-frequency signals are contacted by prod 12, they are merely amplified by tube 10 and its associated circuit, with the amplified signal being applied to the input circuit of tube 16. Tip jack 34, directly connected to the grid of tube 10, is available for testing crystal microphone or phonograph pickups, tube 10 in this instance functioning only as an audio-frequency amplifier.

Jack 36 is connected to the chassis of the apparatus under test or to the common ground of the circuit under test. Potentiometer 38, connected across the output of tube 10, serves as a gain control, any desired portion of the output signal of tube 10 being applied to the grid of tube 16. Jack 40 provides for connection to tube 16, bypassing amplifier tube 10 where its use is not required, such as when only audio-frequency signals of considerable amplitude are desired to be checked. Tube 16 and its associated circuit constitute a second stage of amplification for audio-frequency signals (when tube 10 is used), or a single stage of amplification when the audio signal is applied directly to the terminal 40. The audio signal appearing at the output of tube 16 is applied to phone jack 18. Plugging a headset into this jack permits an output indication at this point.

With double-pole-double-throw switch 54 thrown to contacts 43 and 44, double-pole-double-throw switch 56 thrown to contacts 47 and 48, and double-pole-double-throw switch 53 thrown to contacts 51 and 52 the output signal is applied to loud speaker 20.

Speaker 20 may also be used with auxiliary apparatus. With switch 58 thrown to contacts 49 and 50, an audio signal applied at jacks 24, 24 is connected to speaker 20, jacks 24, 24 presenting a low impedance input. With switch 58 thrown to contacts 51 and 52 and switch 56 thrown to contacts 45 and 46, an audio signal applied at jacks 24, 24 is connected to speaker 20, jacks 24, 24 now presenting a high impedance input.

With switch 54 thrown to contacts 41 and 42, plate voltage is applied to magic eye tube 22. A voltage regulator tube 95 is connected between the plate of magic eye tube 22 and ground to provide a regulated plate potential for tube 22, thus improving its accuracy as a measuring device. The output signal of tube 16 is coupled through transformer 60, appearing across the secondary winding. This audio signal is rectified by diode 62 and a negative D.-C. voltage is built up on condenser 64, the amplitude of which is a function of the amplitude of the audio signal appearing across the secondary of transformer 60. With two-pole four-contact switch 66 thrown to contacts 68 and 69, this D.-C. voltage is applied to the grid of tube 22, being filtered by the RC network comprised of resistor 76 and condenser 78. As the prod 12 is contacted with different portions of an apparatus under test, a radio receiver for example, comparative outputs of the test instrument, representative of the gain between successive stages of such apparatus, is then indicated by the action of the magic eye. Gain control potentiometer 38 adjusts the magnitude of the voltage applied to the grid of the magic eye tube 22. A gain in output so slight as not to be discernible audibly will be registered in the eye. This permits accurate tuning adjustments. It should be noted that the instrument is aperiodic, responding to all frequencies. No tuning is required, as is generally true in signal tracers, nor need any changes be made in switching from audio to radio frequency signals.

Positive or negative D.-C. voltages can be measured with the vacuum tube voltmeter portion of the prod equipment. Prod 26 contacts the voltage to be measured, which is applied to the grid of magic eye tube 22 through a voltage divider network. With switch 66 thrown to contacts 70 and 71, the input voltage is applied across resistor 80 to RC network 76, 78 and thence to the grid. With switch 66 thrown to contacts 72 and 73, the input voltage is applied through a voltage divider comprised of resistors 84 and 80. With switch 66 thrown to contacts 74 and 75, the input voltage is applied through a voltage divider comprised of resistors 84 and 82. Thus, three voltage ranges are available.

Switch 86 changes the operating point of tube 22, thereby permitting the measurement of either positive or negative voltages. This switch is thrown to contact 87 for measuring negative voltages, and thrown to contact 88 for measuring positive voltages. Potentiometers 90 and 94 are zero adjustments for positive and negative operations respectively. Potentiometer 92 is the dial adjustment potentiometer. Its position is adjusted until the eye just meets its edges, and the voltage is read from a calibrated dial.

Rectifier tube 28, with its associated circuit, provides D.-C. operating voltage for the instrument and provides at jack 30 a D.-C. voltage for external use. Filament voltage for external use is available at jack 32.

A preferred embodiment has been described as including a vacuum tube voltmeter. The instrument may be desired in a form not including the voltmeter.

The invention described herein may be manufactured and used by or for the Government of the United States of America for Government purposes without the payment of any royalty thereon or therefor.

It is believed that the construction and operation of my invention, as well as the advantages thereof, will be apparent from the foregoing description. It will be understood that while I have shown and described my invention in a particular embodiment, changes may be made in the circuits disclosed without departing from the invention, as sought to be defined in the following claims.

What is claimed is:

1. A test instrument for testing electronic apparatus in which audio-frequency modulated radio-frequencies appear, comprising a first electron tube connected as an untuned triode grid leak detector, said detector being adapted to detect and amplify said modulation, means for applying a modulated signal to said detector, a second electron tube connected as an untuned amplifier, means coupling the audio-frequency output of said detector to said untuned amplifier, a rectifier coupled to said untuned amplifier adapted to produce a negative direct current voltage output, an electron ray tube having a control grid, and means for applying said negative voltage output to said control grid, the action of said electron ray upon application of said negative voltage being indicative of the magnitude of the audio-frequency of said signal applied to said detector.

2. A test instrument for checking the operation of electronic apparatus in which either or both the audio and audio-frequency modulated radio-frequencies appear, comprising a first electron tube connected as an untuned grid leak detector, said first tube being adapted to detect and amplify said modulation when a modulated signal is applied to said detector and being further adapted to amplify said audio-frequency signals when such signals are applied to said detector, a second electron tube connected as an untuned amplifier, a shielded cable coupling the audio output of said first tube to said untuned amplifier, means rectifying the output of said untuned amplifier to produce a direct voltage signal, an electron ray tube having at least an anode and a control grid, means applying said direct voltage signal to said control grid, and means for regulating the plate voltage of said electron ray tube, the action of said magic eye upon application of said direct voltage being indicative of the magnitude of said audio frequency signals.

3. A test instrument for electronic apparatus which provides either visual or aural indication of the presence and relative amplitudes of audio-frequency signals appearing in various stages of said apparatus, said instrument comprising in combination, a first electron tube connected as a grid leak detector for audio-frequency modulated radio-frequency signals and being further adapted to amplify audio-frequency signals, means for applying said signals to said first electron tube, a second electron tube connected as an untuned amplifier, means coupling the output of said first tube to said untuned amplifier, a rectifier adapted to produce a negative voltage signal upon application of the output of said second electron tube thereto, an electron ray tube having at least a plate and a control grid, means coupling said negative voltage signal to said control grid, a loud-speaker, and switching means in circuit with said second electron tube for coupling the output thereof to either said rectifier or both said rectifier and said loud-speaker, said switching means also being so arranged that plate potential is applied to said plate of said electron ray tube when the output of said second electron tube is coupled solely to said rectifier, the loud-speaker providing an aural indication of the presence of said audio-frequency signals, and the action of said electron ray upon application of said negative voltage signal providing a visual indication of the presence and magnitude of said audio-frequency signals.

4. A test instrument for checking the operation of electronic apparatus in which either or both audio-frequency signals and audio-frequency modulated radio-frequency signals appear, said instrument comprising, in combination, a first electron tube connected as an untuned grid leak detector, said first tube being adapted to detect and amplify said modulation when a modulated signal is applied to said detector and being further adapted to amplify audio-frequency signals when such signals are applied to said detector, a prod coupling said signals to said first electron tube, a second electron tube connected as an untuned audio-frequency amplifier, means coupling the output of said first tube to said untuned amplifier, a rectifier adapted to produce a negative voltage signal upon application of the output of said second electron tube thereto, an electron ray tube having at least a plate and a control grid, means coupling said negative voltage signal to said control grid, a loud-speaker, and switching means in circuit with said second electron tube for coupling the output thereof to either said rectifier alone or both said rectifier and said loud-speaker, said switching means also being so arranged that plate potential is applied to the plate of said electron ray tube when the output of said second tube is coupled solely to said rectifier, the loud-speaker providing an aural indication of the presence of audio-frequency modulated radio-frequency signals or audio-frequency signals in said apparatus, and the action of the electron ray upon application of said negative voltage signal providing a visual indication of the presence and magnitude of said signals.

5. A test instrument for testing electronic apparatus in which either or both audio frequency signals and audio frequency modulated radio frequency signals appear, comprising a test prod having an electron tube connected as an untuned grid leak detector, said electron tube being adapted to detect and amplify said modulation frequency signal when a modulated signal is applied to said prod and being further adapted to amplify said audio frequency signals when such signals are applied to said prod, an amplifier having untuned input and output circuits, a shielded cable coupling the output audio frequency signal of said detector tube to the input circuit of said amplifier, a rectifier coupled to the output circuit of said amplifier to produce a direct voltage signal, an electron ray tube having at least a control grid and an anode, means for applying said direct voltage signal to said control grid, and means for regulating the plate voltage of said electron ray tube, whereby the response of said magic eye to said direct voltage signal is indicative of the amplitude of said audio frequency signal.

ARTHUR E. ERICSON.

REFERENCES CITED

The following references are of record in the file of this patent:

UNITED STATES PATENTS

| Number | Name | Date |
|---|---|---|
| 1,673,173 | Worrall | June 12, 1928 |
| 2,105,410 | Daniels | Jan. 11, 1938 |
| 2,110,358 | Dreisbach | Mar. 8, 1938 |
| 2,122,267 | Wagner | June 28, 1938 |
| 2,245,717 | Roberts | June 17, 1941 |

FOREIGN PATENTS

| Number | Country | Date |
|---|---|---|
| 192,935 | Switzerland | Nov. 16, 1937 |

OTHER REFERENCES

Terman, "Radio Engineers Handbook," 1943, pages 615, 978.